Nov. 22, 1955   J. C. HAYES   2,724,519
HAND TRUCK
Filed Oct. 18, 1954
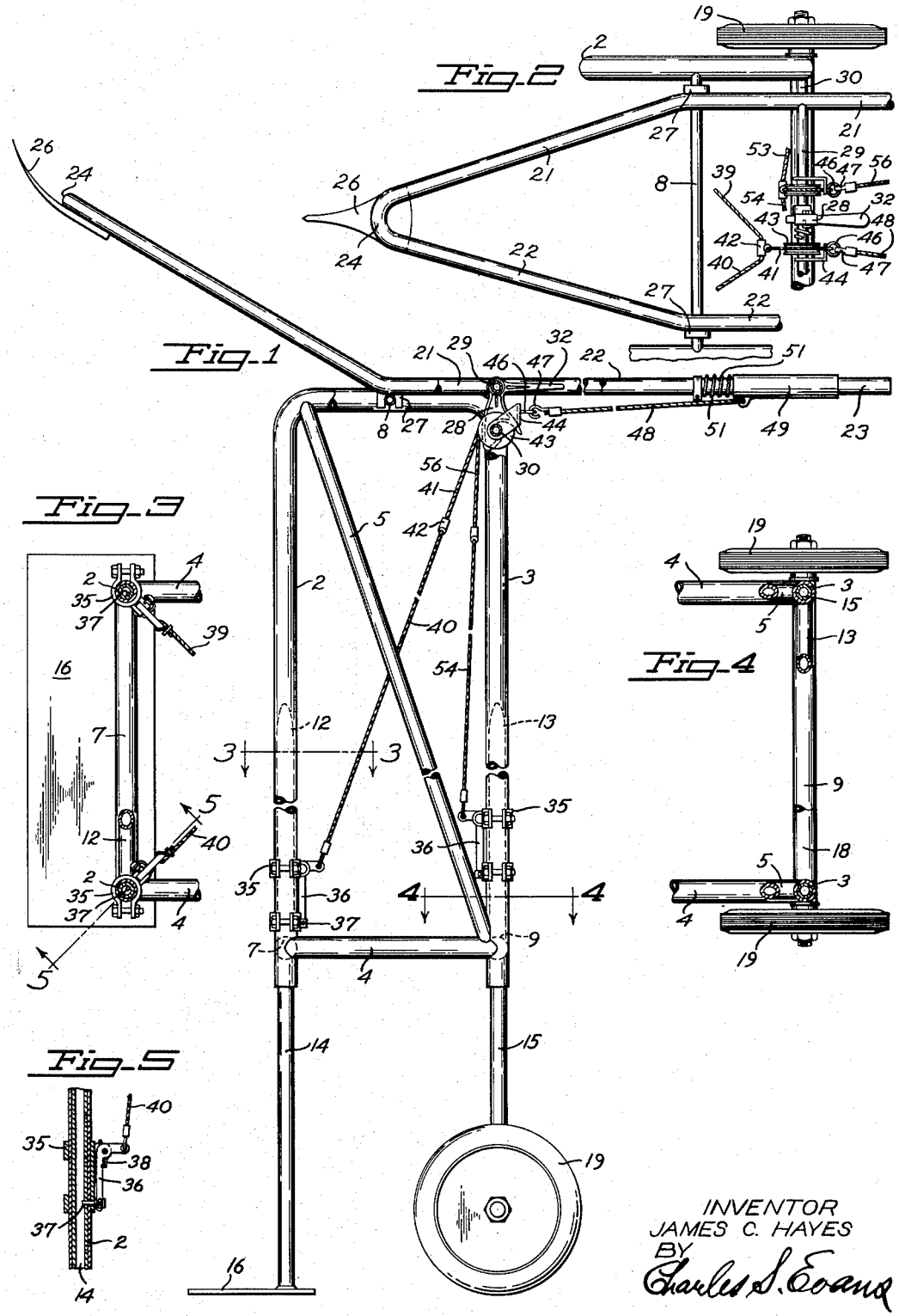
INVENTOR
JAMES C. HAYES
BY
Charles S. Evans
his ATTORNEY

United States Patent Office

2,724,519
Patented Nov. 22, 1955

2,724,519
HAND TRUCK

James C. Hayes, San Bruno, Calif.

Application October 18, 1954, Serial No. 462,858

5 Claims. (Cl. 214—147)

My invention relates to hand trucks particularly adapted for handling sides of beef or other meats.

One of the objects of the invention is the provision of a hand truck with which a side of beef, for example, may be picked up and after carrying to another location, hung or otherwise deposited at the same or a different level, all with a minimum of effort and no heavy lifting by the user.

Another object of my invention is the provision of a hand truck having special adaptation for use in handling heavy sides of beef, and which is also adapted for use in picking up and moving boxes or cases of packaged meats or other merchandise.

The invention possesses other objects, which with the foregoing will be brought out in the following description of the invention. I do not limit myself to the showing made by the description and drawing, since I may adopt variant forms of the invention within the scope of the appended claims.

Referring to the drawings:

Fig. 1 is a side elevation of my truck. Portions of the main frame are omitted to lessen the height of the figure.

Fig. 2 is a plan view of a part of my truck. One side is omitted to reduce the size of the figure, since both sides are alike.

Fig. 3 is a horizontal sectional view taken in the plane 3—3 of Fig. 1, and showing the front portion of my truck including the pick-up plate.

Fig. 4 is a horizontal sectional view taken in the plane 4—4 of Fig. 1.

Fig. 5 is a detail in vertical section through one of the legs and showing the leg latch.

Because a side of beef is heavier than any other similar division of a meat carcass, I will confine this explanation of my invention to its construction and use in connection with the handling of beef sides and quarters.

Broadly my truck comprises three elements—a main frame, legs, and a boom. The legs are telescopically mounted in the main frame so that the frame can be varied in height, and two rear legs are provided with wheels. A boom releasably and pivotally mounted on the main frame is provided at one end with a prong to be engaged in the carcass to be picked up and at the other end with handles by which the boom may be manipulated and the entire truck moved with its load. Manually controlled latches are utilized to fix the legs at the desired height and the boom in position on the frame after loading. The front legs of the truck are provided with a pick-up plate; and when the boom is lifted off and laid aside, the truck may be utilized for picking up from the floor and moving boxes and containers.

In terms of greater detail, my hand truck includes a main frame having two identical sides, each side formed of steel tubing bent in the shape of an inverted U. The sides 2 and 3 point downwardly and are braced by cross tube 4 and long diagonal tube 5 brazed or welded in place. The two sides are rigidly fastened together by cross tubes 7, 8 and 9; and short diagonals 12 and 13 provide stiffness under heavy loads.

The downwardly extending tubular members 2 and 3 on each side constitute leg mounts in which legs 14 and 15 respectively are telescopically arranged. A pick-up plate 16 is fixed across the lower ends of legs 14; and an axle 18 is fixed across the lower ends of legs 15. Wheels 19 are journaled on the ends of the axle.

A removable boom is pivotally mounted on the cross tube 8 at the top of the main frame. The boom is best formed of steel tubing bent as shown in Figs. 1 and 2, to provide two parallel arms 21 and 22 each ending in a handle 23. The arms are bent upwardly and converge to a rounded juncture 24 to which is secured by welding, the prong 26. On the outside and opposite each of the angles where the tubing starts to converge, saddle blocks 27 are welded. Each saddle block which extends well below the tubing has a deep notch in its lower edge, so that they can be dropped over the cross tube 8 to give a secure pivotal mounting of the boom on the main frame.

A spring-pressed latch 28 mounted on the boom cross piece 29 is arranged to engage the cross piece 30 fixed between the two side members 3 near the top and hold the boom in fixed position. The latch is opened by the handle 32 to permit manipulation of the boom in picking up a load.

Means are provided for independently locking each set of legs in their respective downwardly extending tubular mounts 2 and 3. A bracket 35 is clamped about the lower end of each of the frame members 2 and 3. Pivotally hung on each bracket is a bell crank lever 36, at its lower end loosely connected to the lock pin 37, adapted to engage aligned holes in bracket and mount and in the enclosed leg, in which the holes are disposed at short intervals over a length corresponding to the desired range of adjustability. A spring 38 presses the lever to hold the lock pin in the aligned holes.

The other arms of the two levers arranged to control the front legs are connected to cables 39 and 40 which are joined together and to a short cable 41 by a clamp 42. The short cable runs over a pulley 43 conveniently journaled on the cross piece 30, and after passing through a stop plate 44 terminates in a ring 46. A hook 47 provides a releasable connection between the ring and cable 48 secured to the sleeve grip 49, which is tightly pressed by the coil spring 51 toward the handle end 23 of the boom arm 22. Thus with the boom locked in place by the latch 28, forcible movement of the sleeve grip 49 toward the handle 23 by the left hand of the user releases the latches holding the front legs 14, and by rocking the main frame backward or forward on the wheels, the front legs may be extended or retracted as the case may be, and with release of the sleeve grip the lock pins allowed to engage aligned holes to fix the legs in desired adjustment.

The rear legs 15 are similarly controlled by cables 53 and 54 connected by cable 56, Fig. 2, to the right hand sleeve grip on the boom arm 21. By alternate use of the left and right sleeve grips to release and reset the lock pins in the front and rear legs, meanwhile rocking the main frame backwardly and forwardly, the main frame may easily and quickly be adjusted to the desired height to give greatest facility of use to the boom in picking up its load.

With the main frame adjusted to the desired height and the latch 28 released, the prong 26 of the boom may be lowered and the truck maneuvered so that a side of beef may be picked up by the prong. The handle ends of the boom are then pulled down to engage the latch and tip the truck backwardly on its wheels. The truck with its load may then be wheeled to the unloading point where the latch 28 is released and the load hung or otherwise placed.

Disconnecting the latch 28 and the two hooks 47, allows the rings 46 to rest against the stop plates, leaving the boom free to be lifted off the main frame. The truck is then ready for use as an ordinary hand truck to pick up boxes or cases on the pick-up plate 16.

I claim:

1. A hand truck comprising a main frame including front and rear pairs of downwardly extending tubular leg mounts, a pair of front legs telescopically arranged in the front pair of mounts, a pick-up plate fixed at the lower end of the front legs, a pair of rear legs telescopically arranged in the rear pair of mounts, a wheel journaled at the lower end of each rear leg, a boom pivotally mounted in the upper portion of the main frame, a prong on one end of the boom, handle means on the opposite end, latch mechanism interposed between each leg and its tubular mount, and release means on the handle means operatively connected to the leg latch mechanism.

2. A hand truck in accordance with claim 1 in which a manually controlled latch for retaining the boom in raised position is arranged on the main frame.

3. A hand truck comprising a main frame including front and rear pairs of downwardly extending tubular leg mounts, a pair of front legs telescopically arranged in the front pair of mounts, a pick-up plate fixed at the lower end of the front legs, a pair of rear legs telescopically arranged in the rear pair of mounts, a wheel journaled at the lower end of each rear leg, a boom pivotally mounted in the upper portion of the main frame, a prong on one end of the boom, handle means on the opposite end, a spring-pressed lock pin interposed between each leg and its tubular mount, and separate means each including a movable sleeve grip on the handle means and operatively connected respectively to the lock pins of the front legs and to the lock pins of the rear legs.

4. A hand truck comprising a main frame including front and rear pairs of downwardly extending tubular leg mounts, a pair of front legs telescopically arranged in the front pair of mounts, a pick-up plate fixed at the lower end of the front legs, a pair of rear legs telescopically arranged in the rear pair of mounts, a wheel journaled at the lower end of each rear leg, a boom pivotally mounted in the upper portion of the main frame and having a prong at its front end and spaced handles at its rear end, a spring-pressed lock pin interposed between each leg and its tubular mount, a movable sleeve grip on each handle, means operatively connecting the lock pins of the front legs to one of the sleeve grips, and means operatively connecting the lock pins of the rear legs to the other sleeve grip.

5. A hand truck in accordance with claim 4 in which a spring-pressed manually released latch for retaining the boom in raised position is arranged on the main frame.

No references cited.